(12) United States Patent
Spiegelman

(10) Patent No.: US 9,123,048 B2
(45) Date of Patent: Sep. 1, 2015

(54) SYSTEMS AND METHODS FOR RECEIVING AND SPONSORING MEDIA CONTENT

(75) Inventor: Michael Spiegelman, Los Angeles, CA (US)

(73) Assignee: Yahoo! Inc., Sunnyvale, CA (US)

(*) Notice: Subject to any disclaimer, the term of this patent is extended or adjusted under 35 U.S.C. 154(b) by 1807 days.

(21) Appl. No.: 11/551,698

(22) Filed: Oct. 20, 2006

(65) Prior Publication Data

US 2008/0097863 A1    Apr. 24, 2008

(51) Int. Cl.
*G06F 21/00* (2013.01)
*G06Q 30/02* (2012.01)
*G06Q 10/06* (2012.01)
*G06Q 30/06* (2012.01)

(52) U.S. Cl.
CPC .............. *G06Q 30/02* (2013.01); *G06Q 10/06* (2013.01); *G06Q 30/0601* (2013.01); *G06Q 30/0641* (2013.01)

(58) Field of Classification Search
CPC ...................................................... G06F 21/10
USPC ........................................................... 705/57
See application file for complete search history.

(56) References Cited

U.S. PATENT DOCUMENTS

| | | | |
|---|---|---|---|
| 6,434,621 B1* | 8/2002 | Pezzillo et al. ............... | 709/231 |
| 2002/0069282 A1* | 6/2002 | Reisman ........................ | 709/227 |
| 2003/0135464 A1* | 7/2003 | Mourad et al. ................. | 705/50 |
| 2005/0119936 A1* | 6/2005 | Buchanan et al. ............. | 705/14 |
| 2006/0282864 A1* | 12/2006 | Gupte .............................. | 725/89 |
| 2007/0067297 A1* | 3/2007 | Kublickis ......................... | 707/9 |
| 2008/0080392 A1* | 4/2008 | Walsh et al. ................... | 370/254 |

FOREIGN PATENT DOCUMENTS

JP        2002133254 A    *    5/2002    .............. G06F 17/60

OTHER PUBLICATIONS http://web.archive.org/web/20051220155042/www.youtube.com/watch.php?v=7InJipJO9_M.*

* cited by examiner

*Primary Examiner* — James A Reagan

(74) *Attorney, Agent, or Firm* — Berkeley Law & Technology Group LLP

(57) ABSTRACT

A method and system of sponsoring a media item is disclosed herein. A media item is received from a submitter. The media item is published for consumer access. Requests for the media item are received from media consumers. A number of consumer requests for the media item is counted. A determination is made as to whether the number of consumer requests for the media item is higher than a predetermined threshold of popularity. If the number of consumer requests for the media item is determined to be higher than the predetermined threshold of popularity, the media item is sponsored on a webcast station.

37 Claims, 13 Drawing Sheets

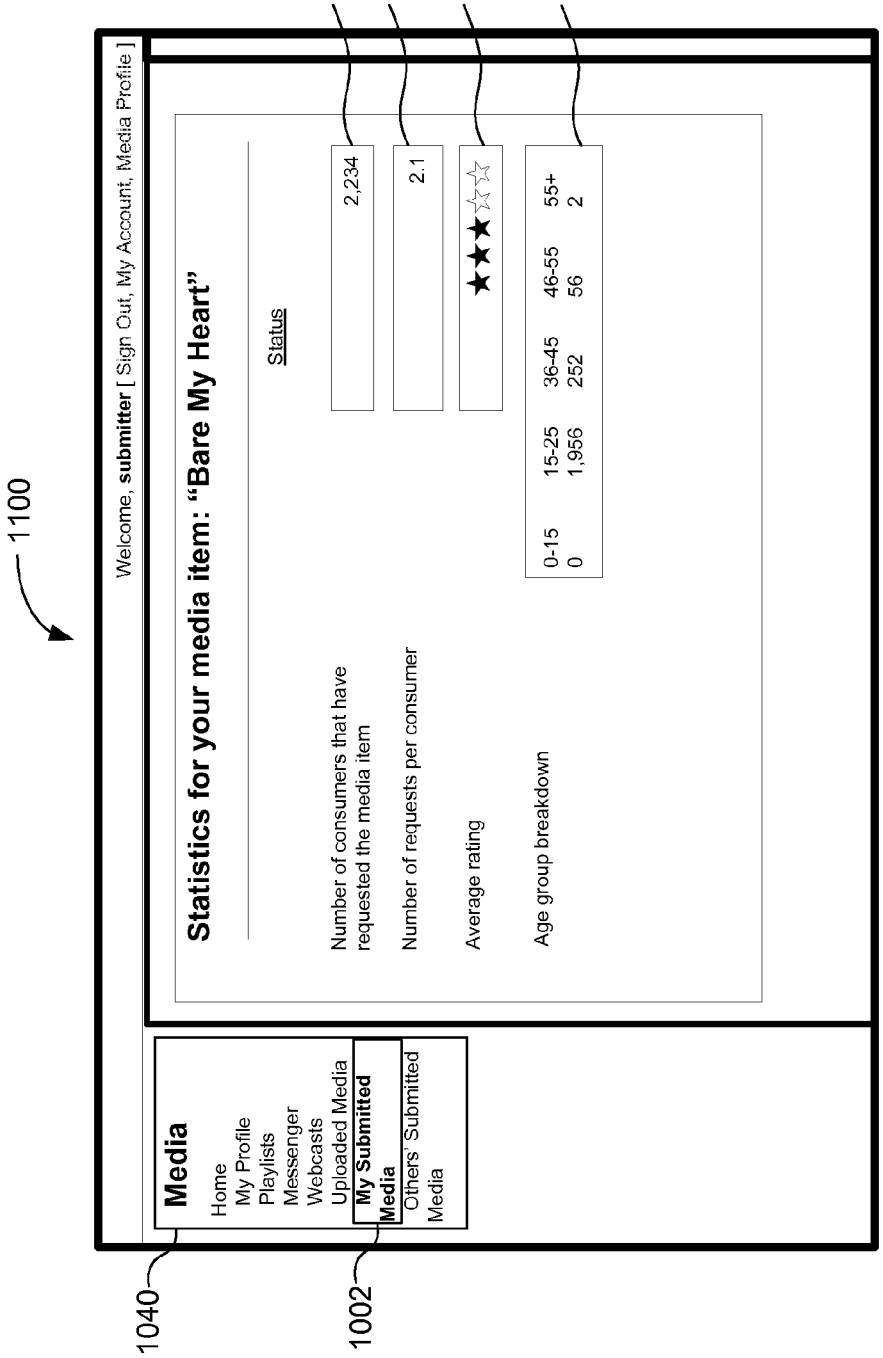

SYSTEMS AND METHODS FOR RECEIVING AND SPONSORING MEDIA CONTENT

BACKGROUND

1. Field

This disclosure relates to systems and methods for managing media. In particular, this disclosure relates to systems and methods for receiving, publishing and sponsoring.

2. General Background

The expansion of the Internet and the World Wide Web ("web") has given computer users the enhanced ability to listen to and to watch various forms of media through their computers, handheld devices, etc. Such media can be in the form of audio music, music videos, and television programs, sporting events or any other form of audio or video media that a user wishes to watch or listen to. Media is now overwhelmingly being distributed through computer networks. As a result, effective media creation and distribution has become accessible to small artists and media producers. Likewise, consumer access to media content on the Internet has increased significantly. Therefore, popularity of media content on the Internet can be a good indicator of the overall success of a media item.

SUMMARY

In one aspect, there is a method of sponsoring a media item. A media item is received from a submitter. The media item is published for consumer access. Requests for the media item are received from media consumers. A number of consumer requests for the media item is counted. A determination is made as to whether the number of consumer requests for the media item is higher than a predetermined threshold of popularity. If the number of consumer requests for the media item is determined to be higher than the predetermined threshold of popularity, the media item is sponsored on a webcast station. The media item can be a song, video, or image.

In further aspects, sponsoring the media item comprises broadcasting the media item on a webcast television station, broadcasting the media item on a webcast radio station, transmitting the media item to a consumer for a subscription fee, or transmitting the media item to a consumer for a downloading fee.

In a further aspect, the consumer request being counted can correspond to requests from all consumers who have requested the media item. In another aspect, the consumer requests being counted can correspond to requests submitted by one consumer such that determining if the number of consumer requests for the media item is higher than a predetermined threshold of popularity comprises determining if the number of consumer requests by the one consumer is higher than an average of per-user requests expected. In a further aspect, consumer requests can include bookmaking.

In a further aspect, feedback is provided to the submitter based on consumer requests for the media item. The feedback provided to the submitter includes a number of consumer requests for the media item. Furthermore, the feedback to the submitter can include a number of consumers requesting the media item.

In another aspect, there is system of sponsoring a media item comprising a media submission module, a media rendering module, and a media sponsoring module. The media submission module receives a media item from a submitter. The media rendering module publishes the media item so that consumers can request the media item. The media rendering module can be configured to count a number of consumer requests for the media item. The media sponsoring module is configured to determine if the number of consumer requests for the media item is higher than a predetermined threshold of popularity.

In another aspect, there is a method of sponsoring a media item. A media item is received at a receiving computer server from a submitter. The media item can be published for consumer access. The media item can be published through a computer network so that consumers can request the media item from a transmitting computer server. Ratings of the media item can be received from the consumers. A high level of popularity of the media item can be established if consumer ratings received from the consumers of the media item reach a predetermined threshold of popularity. The media item can be sponsored if the high level of popularity has been established.

In another aspect, method of sponsoring a media item. A media item is received from a submitter. The media item can be published for consumer access. The media item can be published through a computer network so that consumers can request the media item. It is determined that the media item has reached a first threshold of popularity. If the media item has reached the first threshold of popularity, the media item is sponsored at a first sponsoring level. A determination is made as to whether the media item has reached a second threshold of popularity. If the media item has reached the second threshold of popularity, the media item is sponsored at a second sponsoring level.

DRAWINGS

The above-mentioned features and objects of the present disclosure will become more apparent with reference to the following description taken in conjunction with the accompanying drawings wherein like reference numerals denote like elements and in which:

FIG. 11 depicts a user interface for displaying feedback data to previously submitted media according to one embodiment.

DETAILED DESCRIPTION

The systems and methods disclose herein allow media submitters to submit media to an online service, such as a media sponsor, for showcasing the media to consumers. Based upon popularity among consumers, the submitted media can be sponsored by the online service using one or more sponsoring methods.

A media submitter can be any entity or individual that desires to submit media to the media sponsor. For example, a submitter can include an artist, a band, a record label, a media producer, or any other entity or individual that desires to submit media items to the media sponsor. A media item in turn, can be video, music, ring tones and other non-music items, images, etc.

Submitted media can be received by a media sponsor. The media sponsor can publish, or otherwise make the media item accessible to the public so as to showcase the submitted media items. The media items can then be accessed through a website or any other Internet-based interface. Media consumers can be provided with access to previously submitted media items and assess the media contents submitted by the media submitter.

Media consumers are generally the public that accesses media through Internet-based services by the media sponsor. Media submitters can, of course, be consumers of submitted music by other submitters.

Figure 1:
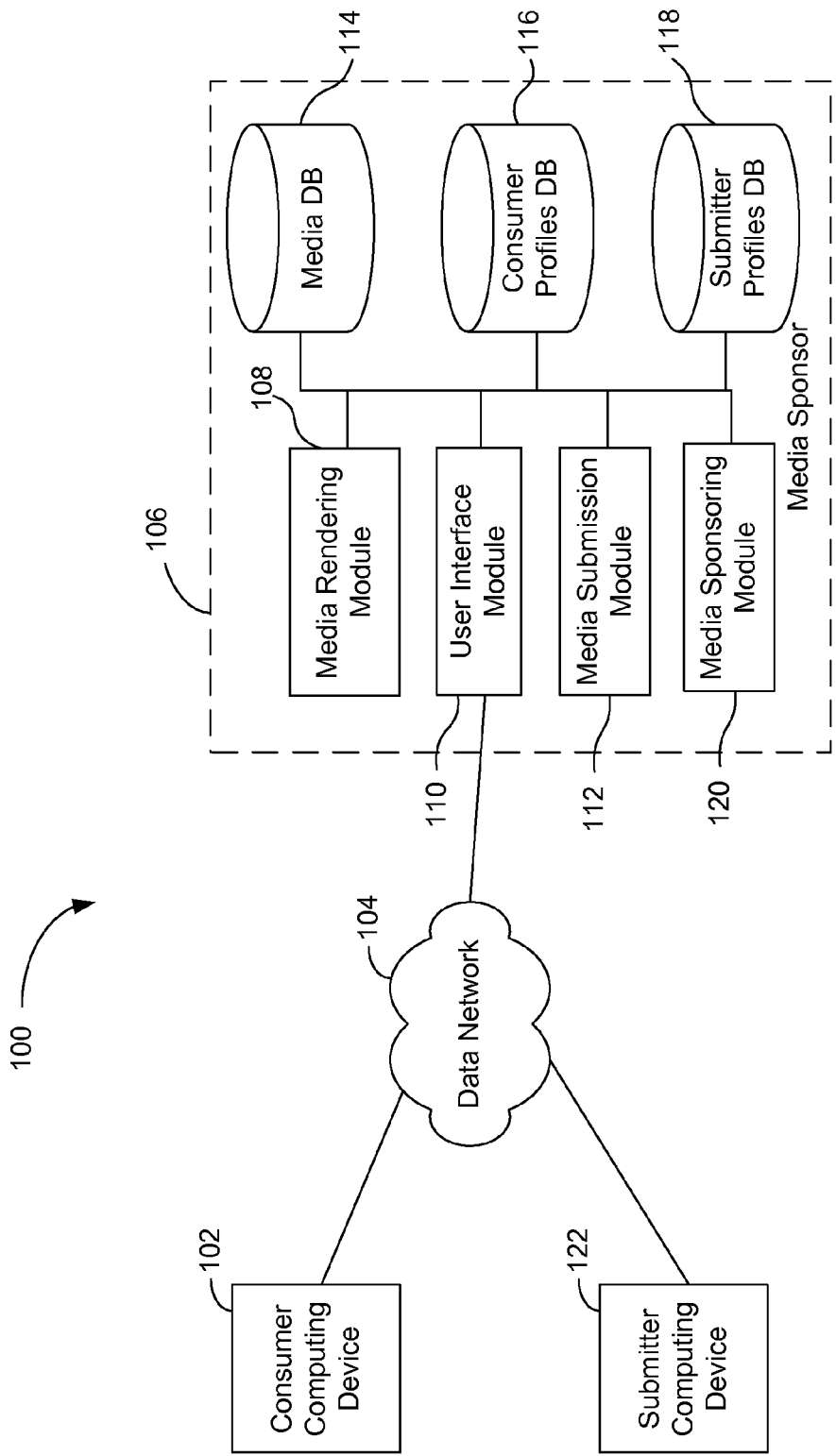
FIG. 1 depicts a system for submitting in publishing media, according to one embodiment.

FIG. 1 depicts a system for submitting in publishing media, according to one embodiment. The system 100 can include a data network 104 through which a submitter can submit media content to a media sponsor 106. In one embodiment, the media submitter can utilize a submitter computing device 122 to interface with the data network 104 in order to submit one or more media items. The submitter computing device 102 can be, for example, a personal computer, a laptop computer, a personal data assistant (PDA), a smart phone, or any other wireless or computing device that the submitter can utilize to transmit the media item. For example, the submitter computing device 122 can also be a client application running on a computing device associated with a record label company. Thus, the record label company can be a media submitter that utilizes the submitter computing device 122 to transmit media items to the media sponsor 106. In one example, the media items being transmitted can include, for example, audio files in the form of music or non-music that are transmitted to the media sponsor 106. In another example, the media items being transmitted can include media files, animation files, photographs, digital photographs, or any other media content that can be electronically transmitted through the data network 104 to the media sponsor 106.

In one embodiment, the data network 104 is the Internet. In another embodiment, the data network 104 is an intranet. In yet another embodiment the data network 104 can be any form of computer network that facilitates transmission of media content from client computer to a server computer, and vice versa.

The media sponsor 106 can be an entity that provides a service for receiving submitted media content and for publishing such received submitted media content on an Internet-based site or application. For example, the media sponsor can provide a website wherein the media item submitted by the media submitter can be published on a website. In another example, the media item can be streamed to media consumers who request the submitted media content. In another example, the media sponsor can provide an application that is downloaded on a consumer computing device 102. The application can be configured to receive streamed media content and render the media content on a display.

The system 100 can further interact with a consumer computing device 102 in order to transmit and render submitted media content to a media consumer. In one example, the media consumer computing device 102 can request a previously-submitted media item through the consumer computing device 102. Again, the consumer computing device 102 can be any form of personal computing device, such as a personal computer, laptop, desktop, PDA, smart phone, etc. In addition, the consumer computing device 102, similar to the submitter computing device 122, can communicate with the data network 104 utilizing one or more communication protocols, such as wireless protocols, for example, Bluetooth, Wi-Fi, cellular communication protocols, satellite communication protocols, etc.

In one embodiment, the media sponsor 106 can include one or more input/output computing and storing devices and structure that can facilitate the receipt, storage, rendering and transmission of submitted media content, as well as measurement of consumer request patterns, volume, etc.

In one embodiment, the media sponsor 106 can utilize a media rendering module 108, a user interface module 110, a media submission module 112, and a media sponsoring module 120. Furthermore, the media sponsor 106 can also utilize one or more storage devices, or data repositories, such as a media database 114, a consumer profiles database 116, and a submitter profiles database 118.

The user interface module 110 can be configured with logic to interface with a media submitter and a media consumer. In one example, the user interface module 110 can receive the submissions from a media submitter via a web-page hosted by the media sponsor 106. In other words, the user interface module 110 can be configured to act as a web server that can accept commands and yield results to a client computer. As such, the user interface module 110 can interact with a media submission module 112 in order to receive submitted media content from a media submitter. The media submission module 112 can be configured with logic to accept media content using one or more predefined algorithms.

In one example, the media submission module can interpret received media item metadata and any other associated data that is submitted with a media item. In addition, the media submission module 112 can also be configured with logic to permit the media submitter to edit the submitted media content or associated metadata prior to publication. In yet another example, the media submission module 112 can be configured with logic to queue the submitted media for review and clearance by the media sponsor 106 before the submitted media is published. For example, if a song is submitted with explicit lyrics and appropriate metadata is not associated with the submitted song indicating that such song includes explicit lyrics, the media sponsor 106 may be able to reject the submitted song through the media submission module 112. In addition, the media submission module 112 can further be configured with automated screening mechanisms.

In another embodiment, the media submission module 112 can further be configured to interact with the submitter profiles database 118 to establish the identity of the media submitter. A media submitter can be an artist, a band, a record label, a media producer, or any other entity or individual that desires to submit media to the media sponsor 106. As such, the submitter profiles database 118 can include records of media submitters including the name, address, contact information, previously published media, and any other associated information that the media sponsor 106 requests or makes mandatory to include in the submitter profile.

In yet another embodiment, the media submission module 112 can also be configured to interact with a media database 114. For example, the media submission module 112 can be configured to store received media item on the media database 114. The media submission module 112 can utilize metadata and tags that have been associated with a submitted media item in order to classify the submitted media and store the media item in the media database 114.

The media sponsor 106 can further utilize a media rendering module 108. Media rendering module 108 can interact with the media database 114 and the user interface module 110 to retrieve media content that requested by a consumer. Upon retrieving the media content from the media database 114, the media rendering module 108 can render the media content to the consumer computing device 102 through the user interface 110. As such, the media rendering module 108 can be configured as a streaming server that streams media content, such as music or video to the consumer computing device 102. In addition, the media rendering module 108 can also be configured to render the media content to the consumer computing device 102 by acting as a download server that permits the consumer computing device 102 to download a media item.

In another embodiment, the media sponsor 106 can configure one or more modules with logic to calculate the popularity of media items stored in the media database 114. In one embodiment, the media rendering module 108 can be configured with logic to determine the number of times the particular media item has been requested by a consumer. In another embodiment, the media rendering module can be configured with logic to determine and store ratings of consumers for a particular media item.

Alternatively, a media sponsoring module 120 can be configured with logic to determine the number of times that a media item has been requested by consumers. In another embodiment, the media sponsoring module 120 can be configured with logic to determine and store ratings associated with consumers that have submitted ratings for a particular media item. In addition, in one or more embodiments, other forms of counting or determining the popularity of a media item can be utilized and configured in one or more modules. The ratings and/or number of times the media item has been requested can further be stored in the media database 114 in relation to the corresponding media item.

The media sponsoring module 120 can further be configured with logic to determine whether the popularity of a particular media item has reached a level that warrants the sponsoring of the media item. For example, a media item that has been submitted by a media submitter and thereafter published and rendered to one or more consumers can have an associated popularity rating or level. As previously mentioned, the popularity rating or level can be directly proportional to the number of requests of the media item by consumers. In another example, the popularity of rating of a media item can be directly proportional to actual ratings provided by consumers of the media item. In another example, the popularity of rating of a media item can be any other indicator established by the media sponsor 106. In addition, the media sponsor 106 can further establish a popularity threshold that a media item must reach before the media item is sponsored by the media sponsor 106.

In one embodiment, the media sponsor 106 sponsors a media item by including the media item as part of a webcast station. In another embodiment, the media sponsor 106 sponsors the media item by providing the media item through a podcast. In another embodiment, the media sponsor 106 sponsors the media item by including the media item in a website dedicated for the top media items of the month, or any other to-be-determined period of time. In another embodiment, the media sponsor 106 sponsors the media item by providing the media item through a subscription service wherein consumers can download or otherwise access the media item after paying a fee. In another embodiment, the media sponsor 106 sponsors the media item by providing the media item as a pay-per-download item on a webpage. In yet another embodiment, the media sponsor 106 sponsors the media item by providing the media item on a website dedicated to the media submitter. In yet another embodiment, the media sponsor 106 sponsors the media item by providing the media item on a website dedicated to the media creator.

Therefore, if the popularity level of a media item has reached a pre-determined popularity threshold, the media sponsor 106 can sponsor the media item via the aforementioned methods or any other sponsoring methods now known or to become known.

For example, if a media submitter submits a song that the media sponsor 106 publishes, the song can then be provided to consumers for access without the media sponsor initially sponsoring the media item. As the song becomes more popular, and a number of requests for the song increases, the media sponsoring module 120 can be configured with logic to compare the number of requests for that particular song against the pre-determined threshold of popularity. For example, if the media sponsor 106 has set the pre-determined threshold of popularity to be one thousand, the media sponsor 106 will sponsor, or at least offer to sponsor, the media item if the number of requests for the song is at least one-thousand. Upon reaching the one-thousand popularity level mark, the media item can be sponsored by the media sponsor 106 to one of the above-mentioned methods of sponsoring. In addition, further levels of sponsoring can also be introduced. Thus, as a media item continues to gain popularity, the media sponsor 106 can continue to further promote the media item and become a more invested sponsor. For instance, the media sponsor 106 can establish a first popularity level and a second popularity level. The first popularity level can be attained by a media item that has been requested a number of times that is at least equal or greater than a first popularity threshold (e.g., one-thousand requests). Then, a second popularity level can be attained by a media item that has reached or exceeded a second popularity threshold (e.g., five-thousand requests).

Figure 2:
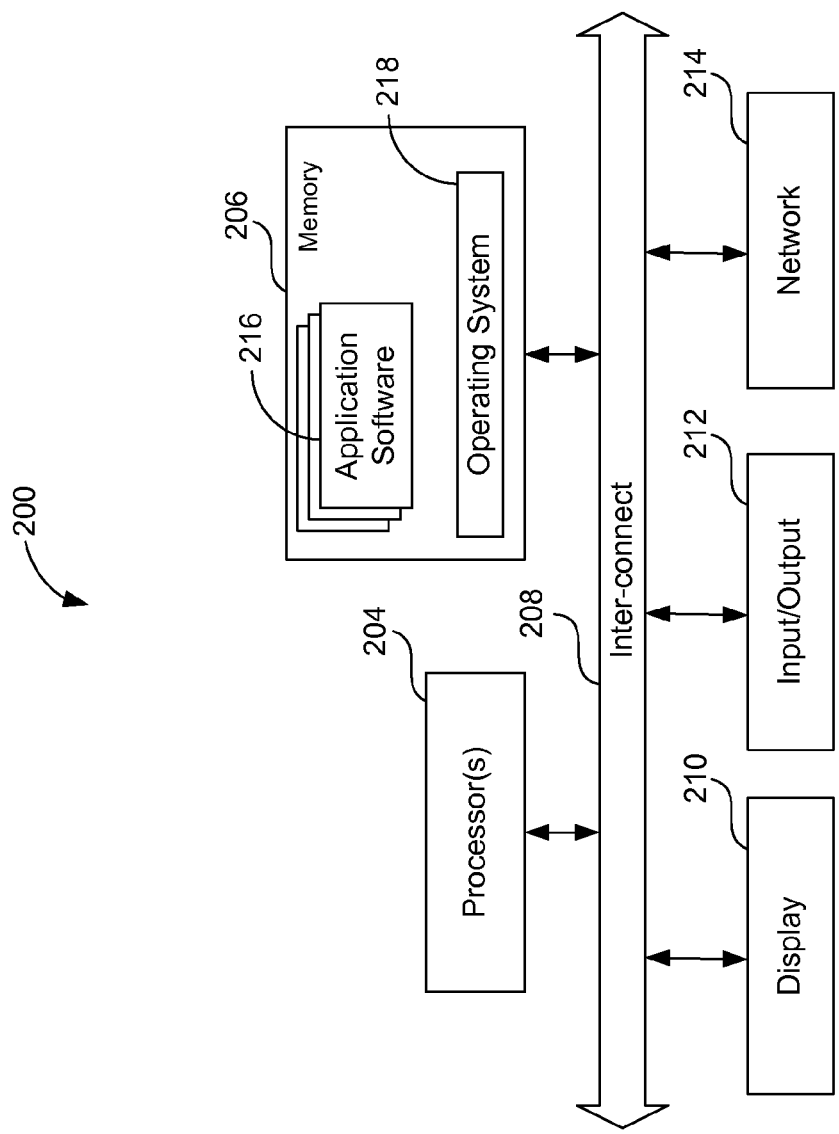
FIG. 2 depicts a component diagram of one example of a computing device 200.

FIG. 2 depicts a component diagram of one example of a computing device 200. The user computing device can be utilized to implement one or more computing devices, computer processes, or software modules described herein. In one example, the user computing device 200 can be utilized to process calculations, execute instructions, receive and transmit digital signals, as required by the consumer computing device 102, the submitter computing device 122, or any of the modules 108, 110, 112, and 120. In one example, the user computing device 200 can be utilized to process calculations, execute instructions, receive and transmit digital signals, as required by user interface logic, video rendering logic, decoding logic, or search engines as discussed below.

Computing device 200 can be any general or special purpose computer now known or to become known capable of performing the steps and/or performing the functions described herein, either in software, hardware, firmware, or a combination thereof.

Computing device 200 includes an inter-connect 208 (e.g., bus and system core logic), which interconnects a microprocessor(s) 204 and memory 206. The inter-connect 208 interconnects the microprocessor(s) 204 and the memory 206 together. Furthermore, the interconnect 208 interconnects the microprocessor 204 and the memory 206 to peripheral devices such input ports 212 and output ports 210. Input ports 212 and output ports 210 can communicate with I/O devices such as mice, keyboards, modems, network interfaces, printers, scanners, video cameras and other devices. In addition, the output port 210 can further communicate with the display 104.

Furthermore, the interconnect 208 may include one or more buses connected to one another through various bridges, controllers and/or adapters. In one embodiment, input ports 212 and output ports 210 can include a USB (Universal Serial Bus) adapter for controlling USB peripherals, and/or an IEEE-1394 bus adapter for controlling IEEE-1394 peripherals. The inter-connect 208 can also include a network connection 214.

The memory 206 may include ROM (Read Only Memory), and volatile RAM (Random Access Memory) and non-volatile memory, such as hard drive, flash memory, etc. Volatile RAM is typically implemented as dynamic RAM (DRAM), which requires power continually in order to refresh or maintain the data in the memory. Non-volatile memory is typically a magnetic hard drive, flash memory, a magnetic optical drive, or an optical drive (e.g., a DVD RAM), or other type of memory system which maintains data even after power is removed from the system. The non-volatile memory may also be a random access memory.

The memory 206 can be a local device coupled directly to the rest of the components in the data processing system. A non-volatile memory that is remote from the system, such as a network storage device coupled to the data processing system through a network interface such as a modem or Ethernet interface, can also be used. The instructions to control the arrangement of a file structure may be stored in memory 206 or obtained through input ports 212 and output ports 210.

In general, routines executed to implement one or more embodiments may be implemented as part of an operating system 218 or a specific application, component, program, object, module or sequence of instructions referred to as application software 216. The application software 216 typically can comprises one or more instruction sets that can be executed by the microprocessor 204 to perform operations necessary to execute elements involving the various aspects of the methods and systems as described herein. For example, the application software 216 can include media rendering, media submission, and/or media sponsoring logic.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks, (DVDs), etc.), among others. The instructions may be embodied in digital and analog communication links for electrical, optical, acoustical or other forms of propagated signals, such as carrier waves, infrared signals, digital signals, etc.

Figure 3:
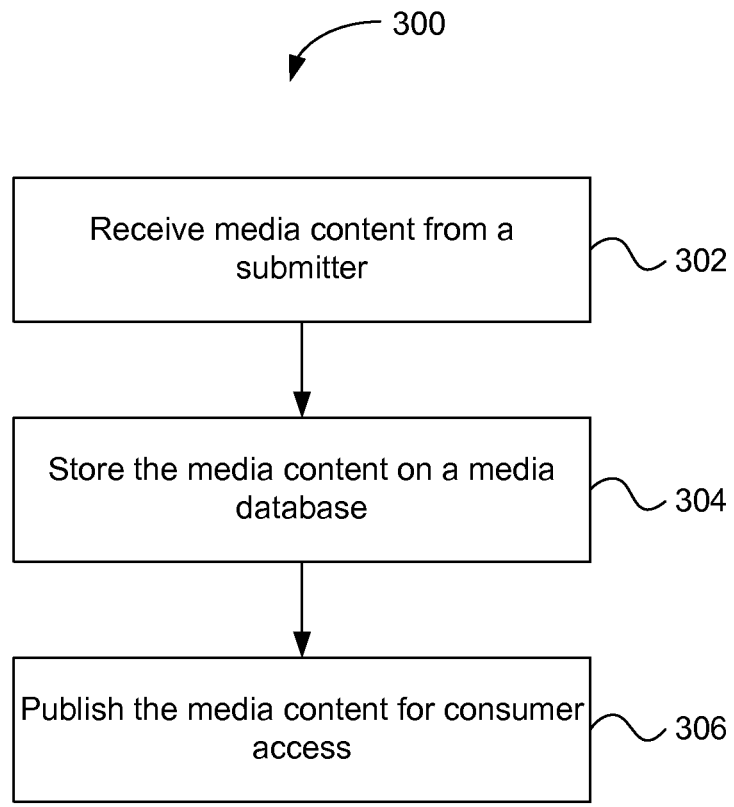
FIG. 3 depicts a flow diagram of a process for receiving media submissions according to one embodiment.

FIG. 3 depicts a flow diagram of a process for receiving media submissions according to one embodiment. At process block 302, media content is received from a submitter. In one example, a submitter can utilize an upload tool that can interact with a website, and that permits the submitter to upload one or more media items to the media sponsor 106. In addition, the media tool can include attaching mechanisms that allow the media file or media item to be attached as an electronic file or container and be uploaded to the media sponsor 106.

Furthermore, the submitter can submit metadata such as group name or band name, creator names, media title (e.g., a song title), media title order (e.g., a track number of a song in an album), a media group name (e.g. an album title), a media release date, media group image (e.g., an album art), category names (e.g., genres), biographies, etc.

One or more optional tools can further be available to better describe the media item being submitted. For example, a genre tree can be provided corresponding to an appropriate country such that a submitter can select the most relevant genre to which the submitted media corresponds. Furthermore, submitters can be provided with the ability to make edits prior to the display of the media content by the media sponsor 106. As previously mentioned, the media submission module 112 can be configured with logic to allow the submitter to approve the submitted media for posting, as well as enter further information regarding usage of the media. For example, the submitter can also provide a license to use the media item. The process 300 continues at process block 302.

At process block 302, the media content received is stored in a media database. The media submission module 112 can, for example, be utilized to store the submitted media content in the media database 114. As part of storing the media content, the metadata provided by the submitter can be also stored in the media database 114 in association with the media item submitted. Further, the submitter name can be matched against existing profiles in the submitter profiles database 118 so as to create a relationship between the recently-submitted media item residing at the media database 114 and the submitter of the media item. Process 300 continues at process block 306.

At process block 306, the media content received is published for consumer access. The media content received from the submitter can be made available for consumers to download, stream, or otherwise access the media content received from the submitter. In one embodiment, the media content is published for free access to the media content. In other words, consumers accessing the media content and viewing or listening to the media content would be able to access such content without payment of a fee or being part of a subscription service, etc. In addition, the media content can be published by providing an interface that allows a consumer to search for media content that meets pre-specified criteria established by the consumer.

Figure 4:
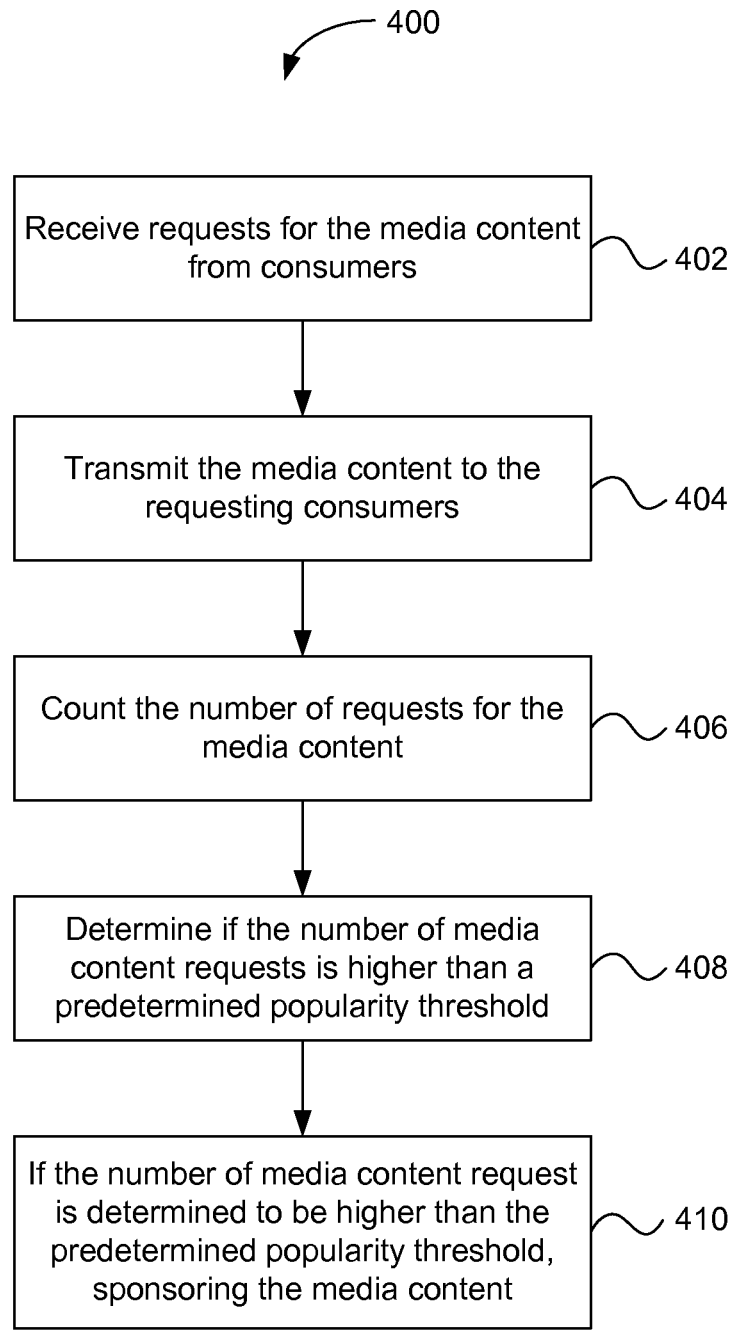
FIG. 4 depicts a flow diagram of a process for sponsoring media content utilizing a count of media content requests according to one embodiment.

FIG. 4 depicts a flow diagram of a process for sponsoring media content utilizing a count of media content requests according to one embodiment. At process block 402, requests for the media content are received from consumers. The process 400 continues as process block 404. At process block 404 the media content is transmitted to the requesting consumers. As previously mentioned, the media content can be transmitted electronically over a data network 104 to a client computing device that the media consumer utilizes. The process 400 continues at process block 406.

At process block 406 the number of media content requests are counted. In one example, after each media content request the count of the number of media content requests can be increased by one. The count for the number of media content requests can further be associated with a particular media item. Thus, for example, if a submitter submits a first media item and a second media item, the first media item would have a first count configured to count the number of requests that have been submitted for the first media item. Likewise, the second media item would have a second count associated with the second media item that stores the number of requests for the second media item. Process 400 continues at process block 408.

At process block 408, it is determined whether the number of media content requests is higher than a pre-determined popularity threshold. Process 400 continues at process block 410. At process block 410 the media content is sponsored if it is determined that the number of media content requests is higher than the pre-determined popularity threshold. Various sponsoring methods as described above can be utilized. For example, providing the media content in an online webcast radio station, or via a podcast, or via a subscription-based media delivery service can be among methods utilized to sponsor the media content. In addition, the media content can further be sponsored at multiple levels. Thus, multiple-level sponsoring can include offering the media content on an online radio channel at a first level of sponsoring. Further, media content can be provided for downloading at a subscription-based online service on a second level of sponsoring.

Figure 5:
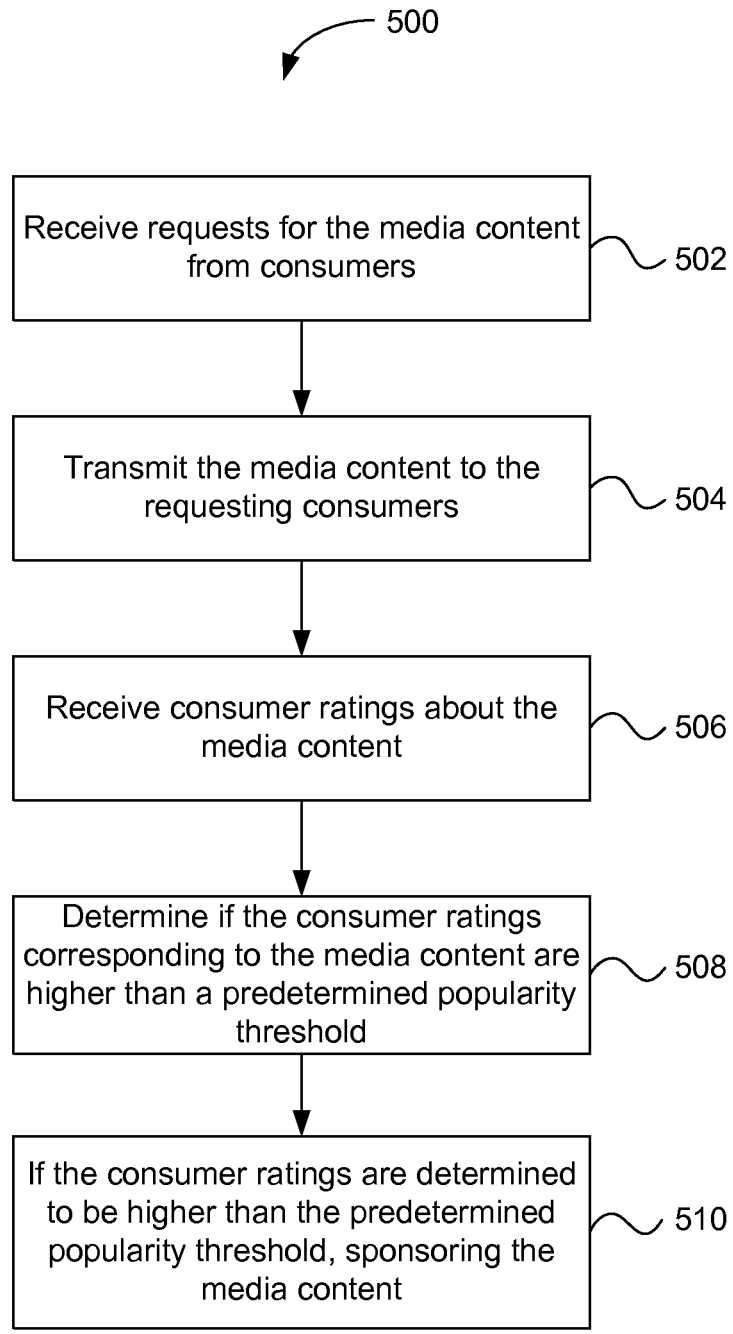
FIG. 5 depicts a flow diagram of a process for sponsoring media content utilizing media ratings according to one embodiment.

FIG. 5 depicts a flow diagram of a process for sponsoring media content utilizing media ratings according to one embodiment. At block 502 requests for media content are received from consumers. Process 500 continues at process block 504. At process block 504, the media content is transmitted to the requesting consumers. Process 500 continues at process block 506.

At process block 506, consumer ratings are received regarding the media content. In one example, consumer ratings can include a score from one to five that a media consumer has assigned to the media content. The consumer ratings can be further stored in association with a media content item such that further retrieval of the rating information associated with a particular media item can easily be achieved. Process 500 continues at process block 508.

At process block 508, it is determined if the consumer ratings corresponding to the media content are higher than a pre-determined popularity threshold. In one example, the pre-determined popularity threshold can be established to be four on a scale of one to five. A score of one can be the lowest score and a score of five can be the highest score. In another embodiment, the determination of whether the pre-determined popularity threshold has been reached can be made based on the number of times a media item has been played by a media consumer. As such, determining if the number of consumer requests for the media item is higher than a predetermined threshold of popularity comprises determining if the number of consumer requests by the one consumer is higher than an average of per-user requests expected.

In another embodiment, the determination of whether the pre-determined popularity threshold has been reached can be made based on the number of consumers that have bookmarked the media item. Other rating skills and popularity thresholds can also be established by the media sponsor 106, as can be apparent to one skilled in the art.

Process 500 continues as process block 510. At process block 510 the media content is sponsored if the consumer ratings are determined to be higher than the pre-determined popularity threshold.

Figure 6:
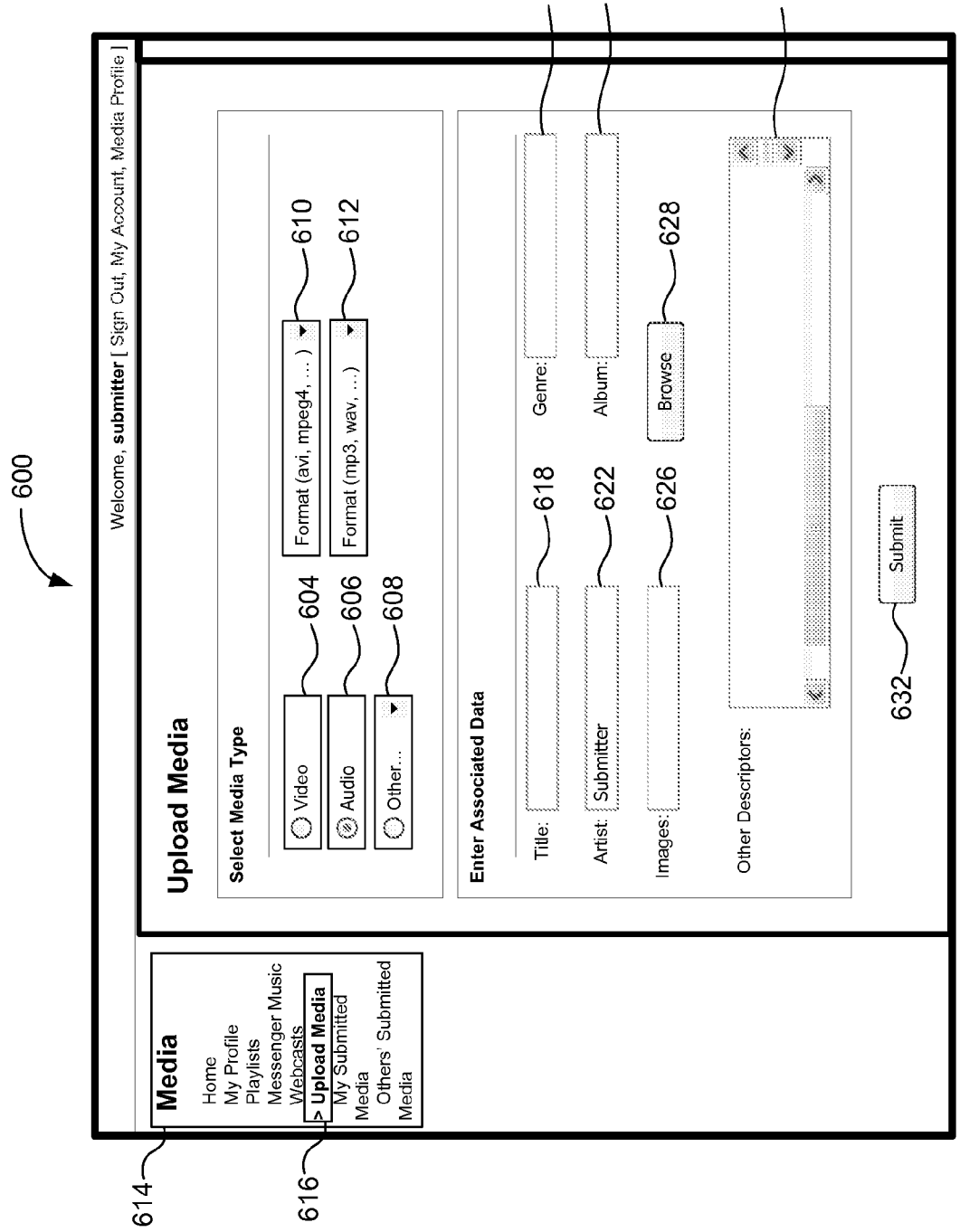
FIG. 6 depicts a user interface for submitting media according to one embodiment.

FIG. 6 depicts a user interface for submitting media according to one embodiment. The user interface 600 can include one or more fields to enter information associated to the media item being uploaded by the submitter. In one example, fields 604, 606 and 608 can be provided as radio button options to permit the submitter to enter or indicate the type of media being uploaded. For example, field 604 can be utilized by a submitter to indicate that the media corresponds to video media content.

Furthermore, field 606 can be utilized by the submitter to indicate that the media content is audio. In addition, a field 608 can be provided so that the submitter can further indicate any other type of media now known or to become known. In addition, when the submitter selects radio button 608, the submitter can further be prompted to enter the type of media and a suitable rendering computer application that can be utilized to present the media item to a media consumer. In addition, a drop down menu 610 can be provided in conjunction with field 604 in order to permit a submitter to enter the type of media that corresponds to a video being uploaded by the submitter. Exemplary formats for video can include AVI, MPEG-4, Windows Media Video, etc. Likewise, a drop down menu 612 can be provided in conjunction with the audio radio button in order to permit a submitter to enter the format type of the audio media item being uploaded by the submitter. Exemplary audio formats can include MP3, WAV, etc.

In a further embodiment, fields for entering metadata or descriptor information can be provided as part of the user interface 600. A title field 618 can be provided to for entering the title of the submitted media item. In addition, a genre drop down menu 620 can be provided as part of the user interface 600 to permit the submitter to enter the genre corresponding to the media item submitted. An artist field 622 can also be included as part of the user interface 600 in order to enter the artist name corresponding to the media being uploaded. In one embodiment, the artist name can be automatically populated according to the username of the submitter. Therefore, the username of the submitter or an associated name and last name or entity name can be entered in artist field 622 as a default. Of course, a submitter can be provided with the opportunity to enter or edit the name of the artist. An album field 624 can be provided so that the submitter can enter the name of the album or another compilation to which the media item being uploaded may belong. Further, an images field 626 and a corresponding browse button 628 can also be provided as part of user interface 600 to permit the submitter to enter image information related to the media item. For example, media item images can include album art, pictures of the band or the artist or still images of a video file, etc. In addition, other descriptor information can be entered in a field 630 such that the media item can be further searchable by keywords associated with the media item. In one embodiment, a submitter can further enter multiple genres associated with a media item and include the entered genres in the media descriptor field 630. A button 632 can further be provided to allow the submitter to submit the entered information and upload the media item.

A media menu 614 can also be provided as part of the user interface 600. A submitter can utilize the media menu to select a menu item 616 to select the uploading of media.

Figure 7:
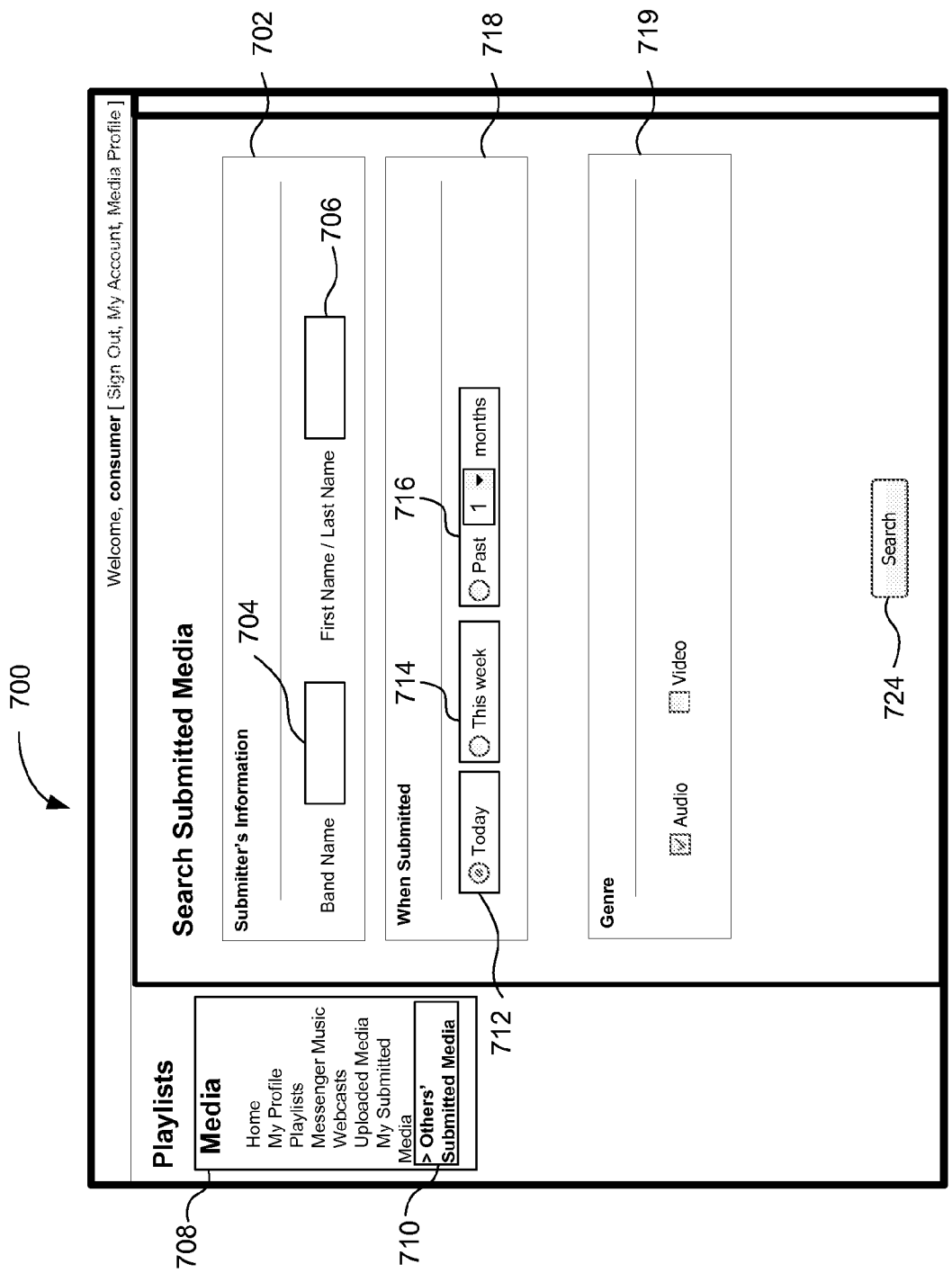
FIG. 7 depicts a user interface for searching submitted media according to one embodiment.

FIG. 7 depicts a user interface 700 for searching submitted media according to one embodiment. Once the media item has been submitted to the media sponsor 106, a media consumer can utilize the user interface 700 to search submitted media that may be of interest to the media consumer. For example, a pane 702 can be displayed so that the consumer can enter submitter's information in order to search for any media related to such submitter. Thus, if the submitter is a band, the consumer can utilize a field 704 to enter the band's name to list the media submitted by the band. In addition, a field 706 can also be utilized by a consumer to search for submitted media by an artist using the artist's first name and last name.

In another embodiment, search criteria related to the time at which the media item was submitted can also be entered in user interface 700. For example, a radio button 712, a radio button 714 and a radio button 716 can be provided such that the consumer can enter a specific time period in which the media item was submitted. For example, radio button 712 can be selected by the consumer to receive a report of all of the media submitted present day. In another example, radio button 714 can be selected if a consumer wants to determine or view all of the media submitted this week. In yet another example, radio button 716 can be utilized by the media consumer to determine the media that has been submitted in the last few months. For example, once the consumer selects the radio button 716, the consumer can further select the number of months corresponding to the time period that the consumer wants to use as a search criteria to find out the submitted media during that time.

In yet another embodiment, a pane 719 can be utilized as part of user interface 700 to receive consumer search criteria regarding the type of the media being searched for by the consumer. For example, the type of the media can be selected to be audio only or video only, or a combination thereof. Furthermore, a search button 724 can be provided as part of the user interface 700 in order to receive a search command from the consumer. A media menu 708 can also be provided as part of the user interface 700. A submitter can utilize the media menu 708 to select a menu item 710. Menu item 710 can permit a consumer to search for media submitted by others.

Figure 8:
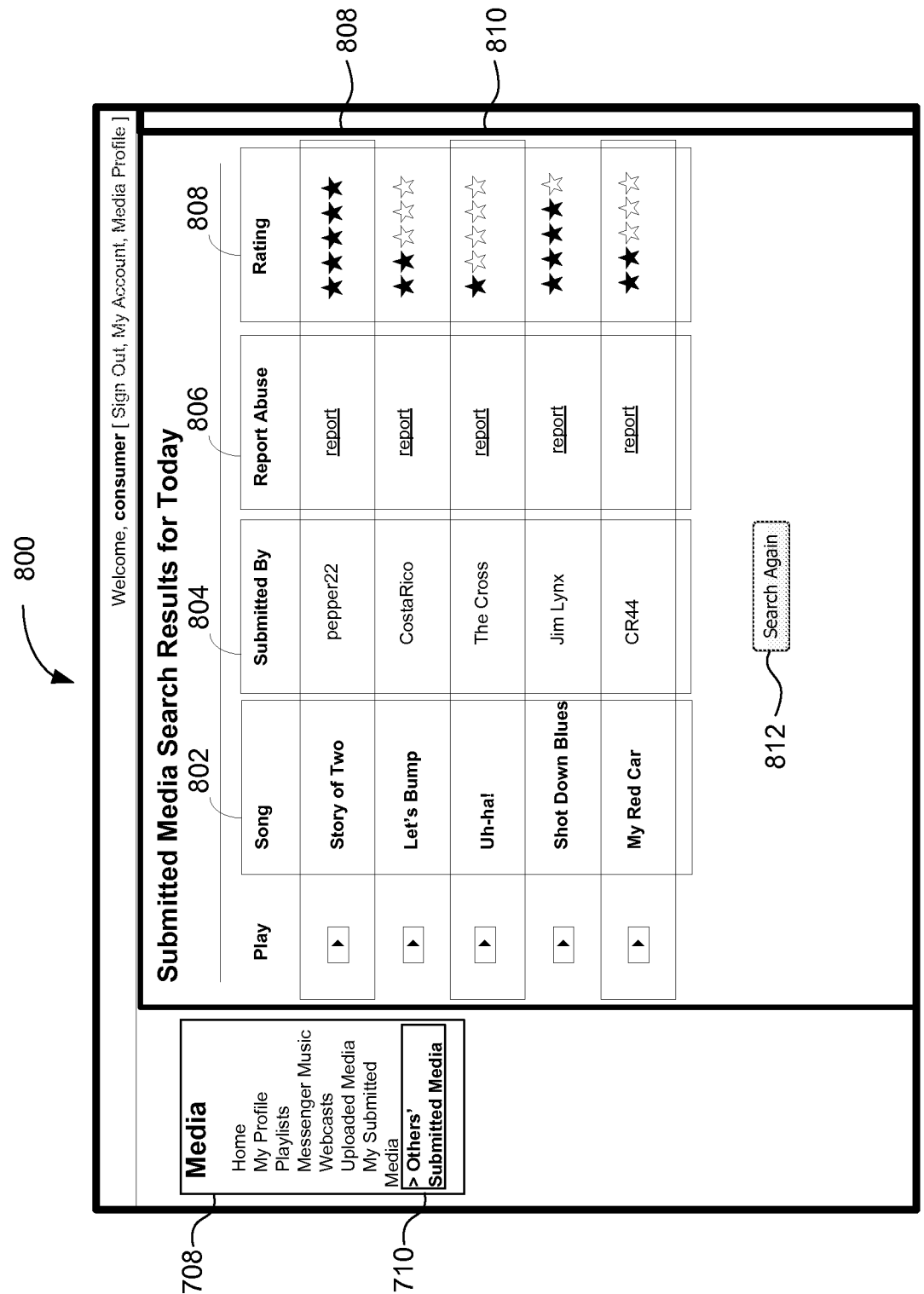
FIG. 8 depicts a user interface for interacting with submitted media according to one embodiment.

FIG. 8 depicts a user interface for interacting with submitted media according to one embodiment. Once a consumer submits a search request, a search results interface can be provided to the consumer as part of the user interface 800. In one embodiment, the listing of the search results can be presented to the consumer either alphabetically, chronologically or in any other order. In one example, as illustrated in the search results displayed as shown in FIG. 8, the results are based on a query for music that has been submitted for the present day. Thus, a media listing 808 can be displayed with a play button the name of the song, namely Story of Two, the name of the submitter, e.g., pepper22, the rating of the song by users and a link to report abuse. As such, the listing can, for example, include a title column 802 and submitted by column 804, a report abuse column 806 and a rating column 814. The rating column 814 can include an average of all of the ratings by consumers that have viewed or listened or otherwise accessed the media item. In addition, the report abuse column 806 can include links that permit a consumer to report an infringement, non-permitted use of lyrics or melody, or the image or likeness of a person, as well as content that may be obscene or that the consumer may find offensive.

In another embodiment, the rating column 814 can correspond to the rating of the consumer viewing the listings such that the consumer can update the rating of the media item according to the consumer's taste. Once the rating is submitted by the consumer, the rating can be applied to the media item and stored for future determination on the popularity of the media item. Likewise, listings 808 and 810 can also include a play button at column 816.

Once a consumer selects a play button, the count of media requests for that specific media item requested can be increased. For example, if the play button in listing 808 is selected by the consumer, the count of media requests corresponding to the media item of listing 808 can be increased by one. As previously mentioned, various methodologies of determining popularity can be utilized. For example, a high count of media requests for a media item can be indicative of popularity. In another example, high ratings of media item can also be indicator of popularity of a media item. In another example, any other measurement of consumer access to the media item, or customer predilection of the media item may be utilized to assess the popularity of the media item. Further user interaction mechanisms can be provided as part of user interface 800. For example, a search again button 812 can be provided so that the consumer can enter new search criteria in order to access submitted media.

Figure 9A:
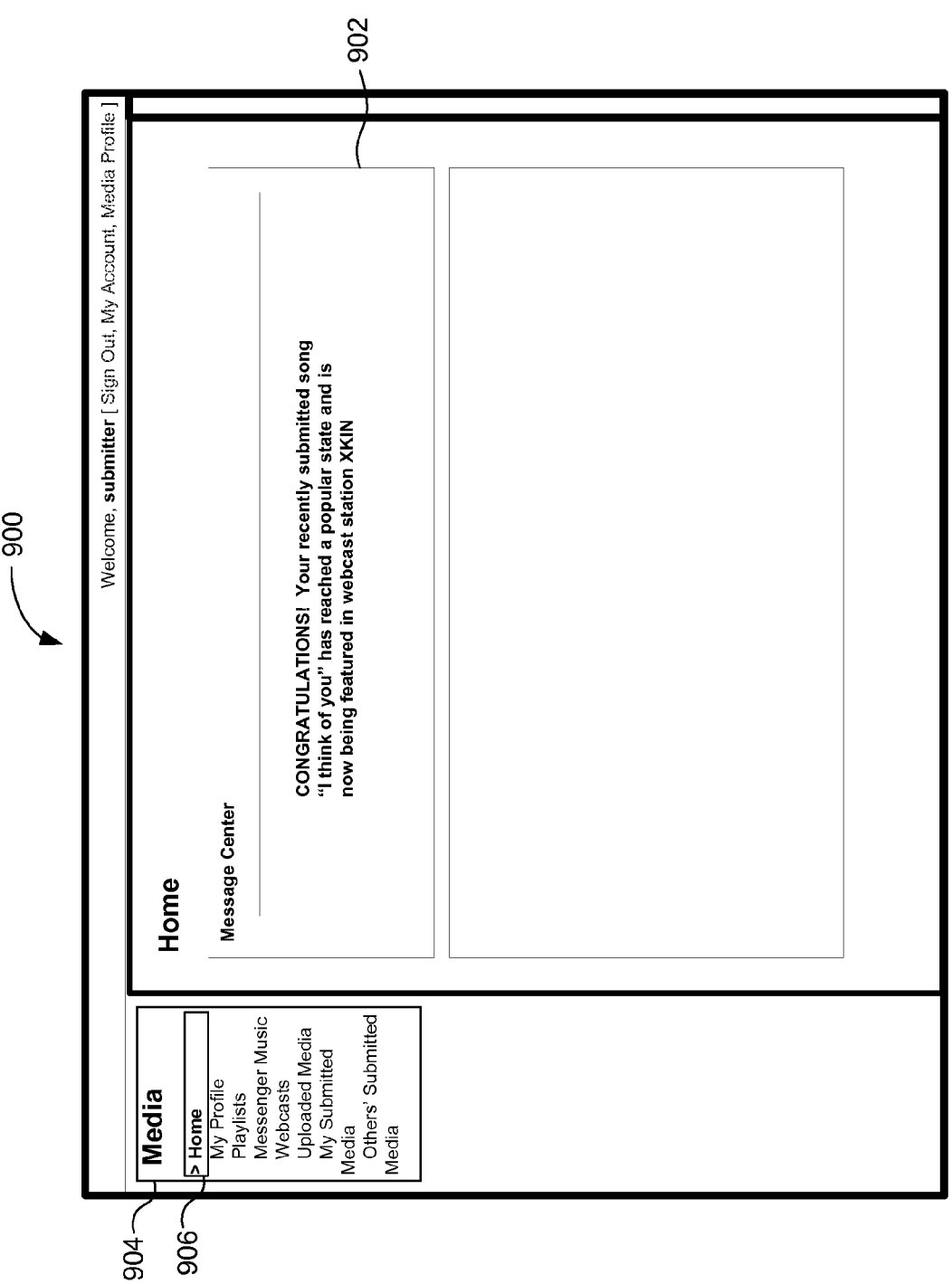
FIGS. 9A-9B depict user interface for notifying a submitter that a previously submitted media item is being sponsored according to one embodiment.

FIG. 9A depicts user interface 900 for notifying a submitter that a previously submitted media item is being sponsored at a radio station according to one embodiment. A media menu 904 can be provided as part of the user interface 900. A submitter can utilize the media menu 904 to select a menu item 906. The menu item 906 can provide the submitter the option to view a main page of the interface 900.

As previously disclosed herein, a media item that reaches a popularity level beyond a predetermined popularity threshold can be sponsored by a media sponsor 106. In one embodiment, the media sponsor 106 sponsors the media item by featuring the media item in a webcast channel. Thus, for example, if the media item is a video, the media item can be displayed in an Internet-based video webcast channel. In another embodiment, if the media item is an audio music file, the audio music content can be featured in a webcast radio channel. As depicted in FIG. 9, a pane 902 can be utilized to display a message indicating that a previously-submitted media item is being featured at a webcast channel. Of course, many other mechanisms for announcing the featuring of a previously submitted media item can be utilized. For example, other communication methods, such as e-mail, text message, phone calling or anything else can be utilized as part of the notification to the submitter.

Figure 9B:
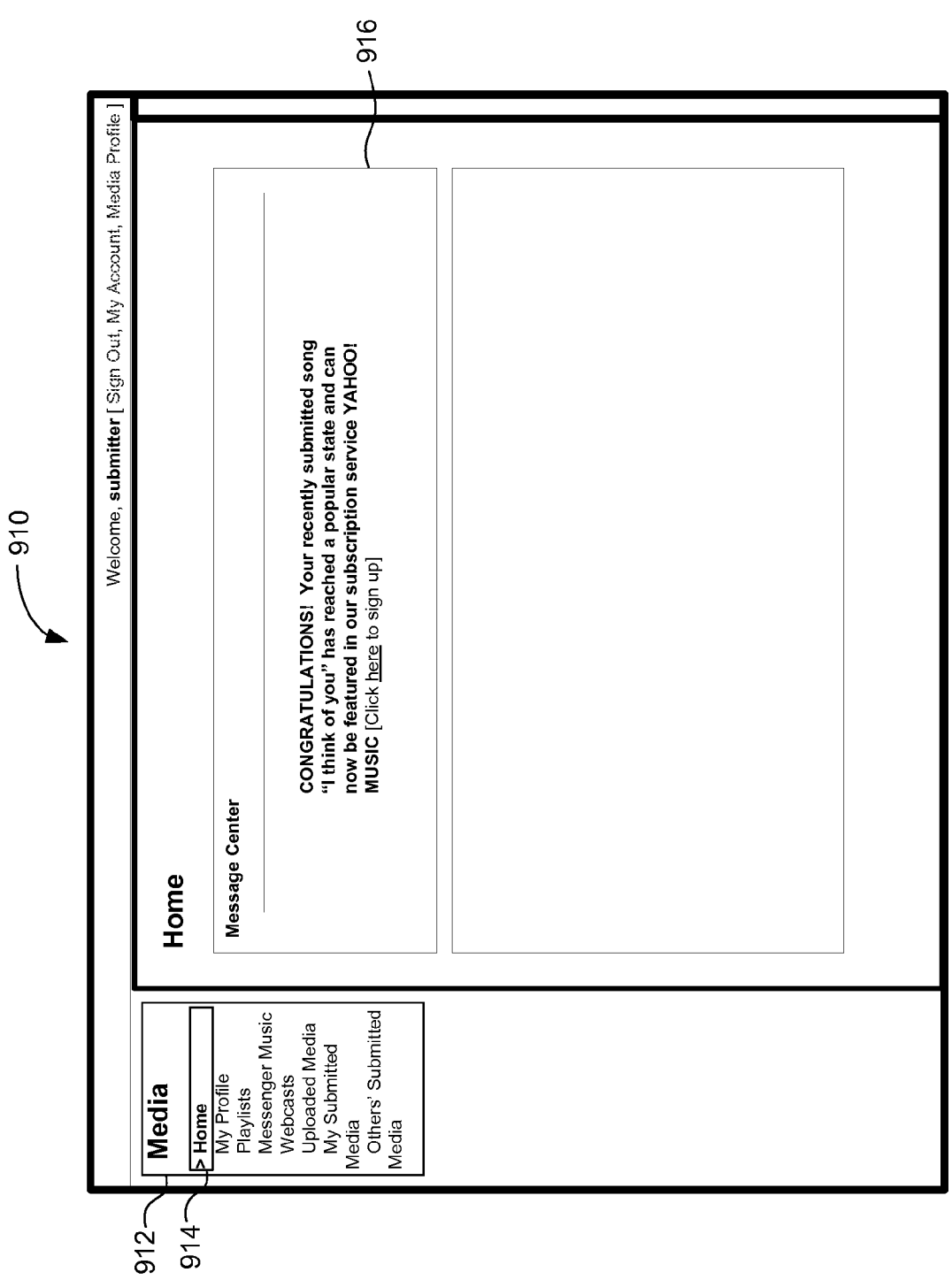

FIG. 9B depicts a user interface for notifying a submitter that a previously submitted media item is being featured at a subscription service. As previously discussed, previously submitted media items can be featured by a media sponsor 106 upon a media item reaching a popularity level that matches or exceeds a predetermined threshold popularity level. The media sponsor 106 can sponsor the media item by featuring the media item as part of a subscription based service. For example, the subscription based service can be a subscription for ring tones. Consumers who subscribe to the service can access one or more ring tones being sponsored by the media sponsor 106. In another example, the subscription service can include photographs. Upon a submitted image reaching a popularity level, the subscription service of the media sponsor 106 can feature the submitted image as part of the subscription service. In another aspect of the subscription service, a consumer may be required to be a fee for obtaining the particular media content. For example, if the media content is an audio music file or a video file, the consumer can be charged a fixed fee for downloading the music file or the video file to the user's computing device (e.g., hand held device).

Figure 10A:
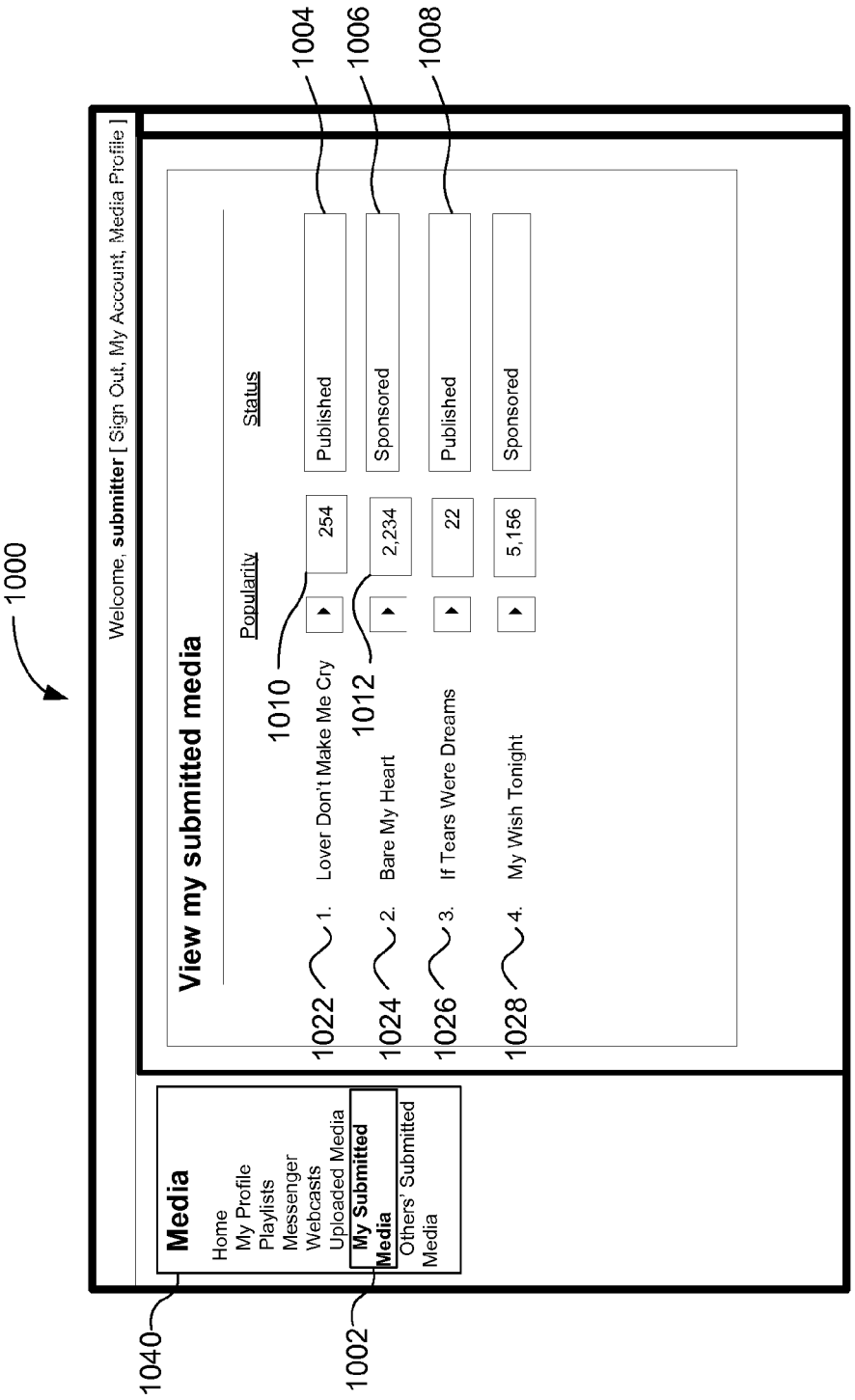
FIGS. 10A and 10B depict user interfaces for displaying a listing of previously submitted media according to one embodiment.
Figure 10B:
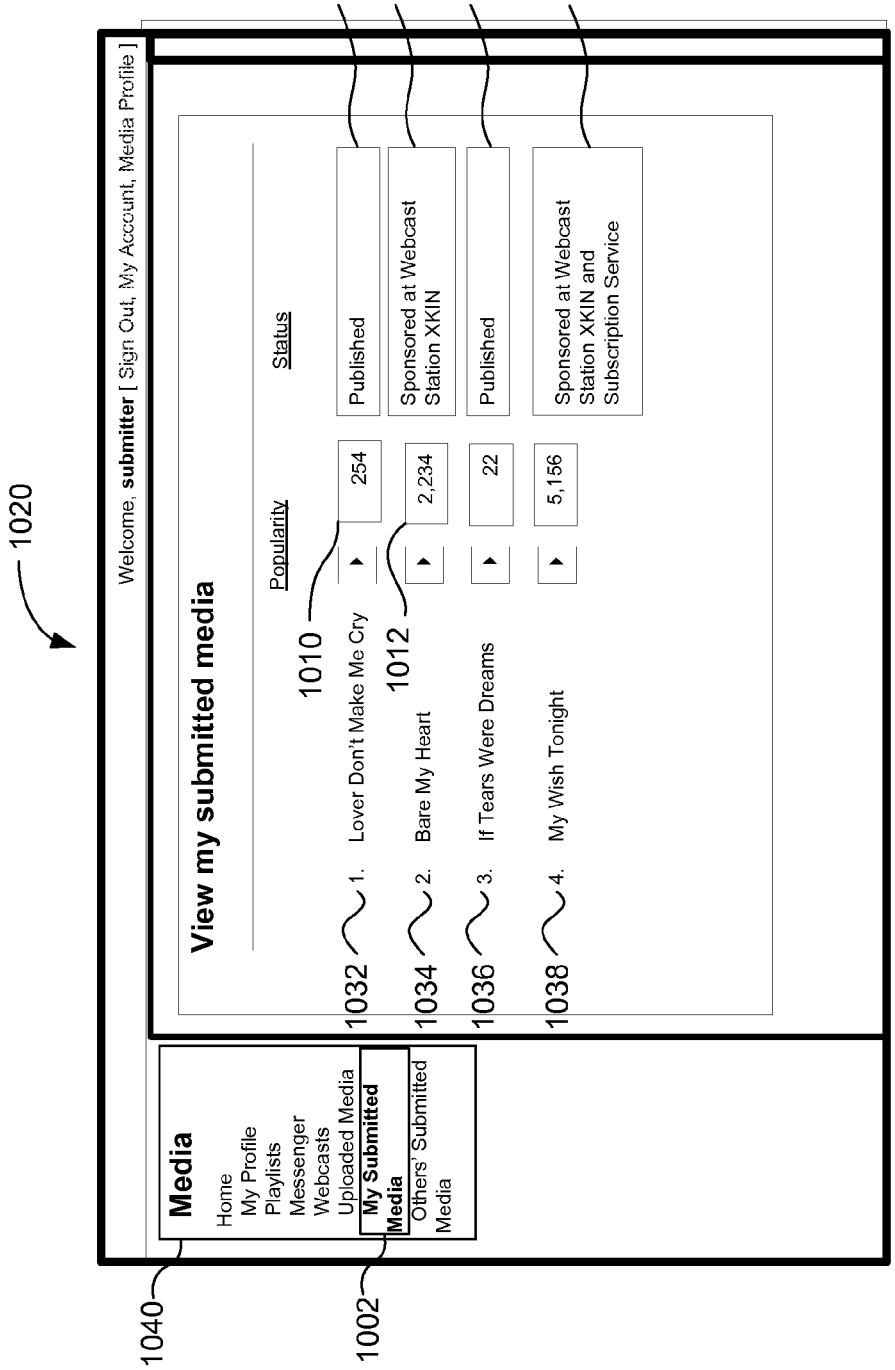

FIGS. 10A and 10B depict user interfaces for displaying a listing of previously submitted media according to one embodiment. A media menu 1040 can also be provided as part of the user interface 1000. A submitter can utilize the media menu 1040 to select a menu item 1002. Menu item 1002 can be selected to access media items listings submitted by a media submitter.

In one embodiment, the submitter can view a listing of each of the media items that the submitter had previously submitted. In addition, relevant information associated to the media items can also be listed in the user interface 1000. For example, the media items can each have a play button that can be used to render the media content of the media item. In addition, an indicator for each media item listing can also be displayed to indicate whether or not the media item is being sponsored by the media sponsor 106. For example, indicator 1004 can indicate that media item corresponding to listing 1022 has been published but that is not currently being sponsored. In addition, a popularity rating 1010 can be included as part of the main indicative of the popularity of media item listing 1022. Likewise, media item listing 1024 can include an indicator 1006 showing that media item two is being sponsored by the media sponsor 106. In addition, media item listing 1024 can also be displayed with its popularity rate 1012 showing 2,234 consumer requests.

In yet a further embodiment, the threshold of popularity can also be displayed such that the viewer can be appraised of how well a particular media item previously submitted by the submitter is doing in comparison to the established popularity threshold. In another embodiment, a differential of the popularity rate and the threshold of popularity can be displayed next to a media item listing such that a submitter can view how close the media item is from being sponsored by the media sponsor 106.

FIG. 10B depicts a user interface for displaying any listing of previously submitted media and indicators as to the level of sponsoring if each media item. Thus, if multilevel sponsoring is offered by the media sponsor 106, the status column can include indicators showing the type of sponsoring, namely the level of sponsoring that each media item is receiving, if any. Thus, for example, while media item listing 1032 and media item listing 1038 are both being sponsored, multi-level sponsoring can allocate greater sponsoring efforts by the media sponsor 106 for media item listing 1038 than for media item listing 1032. This is because the popularity rate of media item listing 1038 has reached and surpassed a pre-established popularity threshold of five-thousand, such that not only is the media item being featured in radio webcast station XKIN, but is also being featured in a subscription service of the media sponsor 106. As such, user interface 1020 indicates a status column wherein media item listing 1034 shows an indicator 1024 displaying the radio webcast station in which the media item number media item listing 1034 is being webcasted. In addition, media interface 1020 also shows indicator 1016 indicative of the sponsoring for media item listing 1038. Namely, that the media item corresponding to media item listing 1038 is being featured at radio station XKIN as well as at a subscription service of the media sponsor 106.

FIG. 11 depicts a user interface for displaying feedback data to previously submitted media according to one embodiment. Feedback data provided to media submitters can include any type of performance or statistical data. Feedback data can assist the media submitter to identify audience demographics, average ratings, ratings distribution, play count, number of listeners, etc., as well as geographic data about the media consumers.

Various user interface mechanisms can be provided to the submitter in order to view feedback data. In one embodiment, the submitter can select on a hyperlinked text of the name of a song listed in the list of submitted media. In another embodiment, a button or other selection mechanism can be provided to the submitter for viewing media item statistical data, demographics and other feedback.

In one example, media submitters can be provided with the total number of consumer requests for a media item. A display textbox 1102 can be provided in the user interface 1100 to show the total number of consumer requests for a media item.

In another example, media submitters can be provided with the average number of consumer requests for a media item. A display textbox 1104 can be provided in the user interface 1100 to show the average number of consumer requests for a media item. In yet another example, media submitters can be provided with the average rating for a media item. A display textbox 1106 can be provided in the user interface 1100 to show the average rating for a media item. In another example, media submitters can be provided with data indicative of the number of consumers per age group. Display textboxes 1108 can be provided in the user interface 1100 to show the number of consumers per age group.

Those skilled in the art will recognize that the methods and systems of the present disclosure may be implemented in many manners and as such are not to be limited by the foregoing exemplary embodiments and examples. In other words, functional elements being performed by a single or multiple components, in various combinations of hardware and software or firmware, and individual functions, can be distributed among software applications at either the client or server level or both. In this regard, any number of the features of the different embodiments described herein may be combined into single or multiple embodiments, and alternate embodiments having fewer than or more than all of the features herein described are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, and those variations and modifications that may be made to the hardware or software or firmware components described herein as would be understood by those skilled in the art now and hereafter.

The invention claimed is:

1. A method comprising:
   receiving, at one or more server computers, a media item from a submitter computing device;
   publishing, via the one or more server computers, an indication of the media item to one or more consumer computing devices to allow one or more consumers to request the media item;
   counting, via the one or more server computers, one or more numbers of consumer requests for the media item submitted by one or more respective consumers;
   determining, via the one or more server computers, whether the one or more numbers of consumer requests for the media item submitted by the one or more respective consumers meets or exceeds a specified threshold of popularity, wherein the specified threshold of popularity is based at least in part on a specified expected average amount of per-user requests; and
   sponsoring the media item at least in part in response to a determination that the one or more numbers of consumer requests for the media item submitted by the one or more respective consumers meets or exceeds the specified threshold of popularity, wherein said sponsoring comprises providing additional transmission of the media item.

2. The method of claim 1, wherein said sponsoring the media item comprises broadcasting the media item on a webcast television station.

3. The method of claim 1, wherein said sponsoring the media item comprises broadcasting the media item on a webcast radio station.

4. The method of claim 1, wherein said sponsoring the media item comprises transmitting the media item to a consumer for a subscription fee.

5. The method of claim 1, wherein said sponsoring the media item comprises transmitting the media item to a consumer for a downloading fee.

6. The method of claim 1, wherein the media item comprises a song.

7. The method of claim 1, wherein the media item comprises a video.

8. The method of claim 1, wherein the media item comprises an image.

9. The method of claim 1, wherein said determining whether the one or more numbers of consumer requests for the media item submitted by the one or more respective consumers meets or exceeds the specified threshold of popularity comprises determining whether a number of consumer requests for the media item submitted by an individual consumer meets or exceeds the specified threshold of popularity.

10. The method of claim 1, wherein the one or more numbers of consumer requests for the media item comprises a number of requests by an individual consumer for the media item, wherein said determining whether the number of consumer requests by the individual consumer for the media item meets or exceeds the predetermined threshold of popularity comprises determining whether the number of consumer requests by the individual consumer meets or exceeds the specified expected average amount of per consumer requests.

11. The method of claim 1, wherein the consumer requests comprise bookmarking.

12. The method of claim 1, wherein the consumer requests comprise requests to consume the media item.

13. The method of claim 1, further comprising providing feedback to the submitter computing device based at least in part on consumer requests for the media item.

14. The method of claim 13, wherein the feedback to the submitter comprises a total number of consumer requests for the media item.

15. The method of claim 13, wherein the feedback to the submitter comprises a number of consumers requesting the media item.

16. A system comprising:
one or more server computers to:
receive a media item from a submitter computing device;
publish an indication of the media item to one or more consumer computing devices to allow one or more consumers to request the media item;
count one or more numbers of consumer requests for the media item submitted by one or more respective consumers;
determine whether the one or more numbers of consumer requests for the media item submitted by the one or more respective consumers meets or exceeds a specified threshold of popularity, wherein the specified threshold of popularity is based at least in part on a specified expected average amount of per-consumer requests; and
sponsor the media item at least in part in response to a determination that the one or more numbers of consumer requests for the media item submitted by the one or more respective consumers meets or exceeds the specified threshold of popularity, the one or more server computers to sponsor the media item at least in part by providing additional transmission of the media item.

17. The system of claim 16, the one or more servers further to sponsor the media item at least in part by broadcasting the media item on a webcast television station.

18. The system of claim 16, the one or more servers further to sponsor the media item at least in part by broadcasting the media item on a webcast radio station.

19. The system of claim 16, the one or more servers further to sponsor the media item at least in part by transmitting the media item to a consumer for a subscription fee.

20. The system of claim 16, the one or more servers further to sponsor the media item at least in part by transmitting the media item to a consumer for a downloading fee.

21. The system of claim 16, wherein the media item comprises a song.

22. The system of claim 16, wherein the media item comprises a video.

23. The system of claim 16, wherein the media item comprises an image.

24. A method comprising:
receiving, by a media sponsor via one or more server computers, a media item from a submitter;
publishing, by the media sponsor via the one or more server computers and via a computer network, the media item to allow one or more consumers to request the media item;
receiving, by the media sponsor via the one or more server computers, one or more ratings of the media item from the one or more consumers; and
sponsoring the media item at least in part in response to a determination that the one or more ratings of the media item from the one or more consumers meet or exceed a specified threshold of popularity, wherein the specified threshold of popularity is based at least in part on the one or more ratings and based at least in part on a specified expected average amount of per-consumer requests for the media item, and wherein said sponsoring comprises providing additional transmission of the media item.

25. The method of claim 24, wherein said sponsoring the media item comprises broadcasting the media item on a webcast television station.

26. The method of claim 24, wherein said sponsoring the media item comprises broadcasting the media item on a webcast radio station.

27. The method of claim 24, wherein said sponsoring the media item comprises transmitting the media item to a consumer for a subscription fee.

28. The method of claim 24, wherein said sponsoring the media item comprises transmitting the media item to a consumer for a downloading fee.

29. The method of claim 24, wherein the media item comprises a song.

30. The method of claim 24, wherein the media item comprises a video.

31. The method of claim 24, wherein the media item comprises an image.

32. A method comprising:
receiving, by a media sponsor via one or more server computers, a media item from a submitter;
publishing, by the media sponsor via the one or more server computers and via a computer network, an indication of the media item to one or more consumer computing devices to allow one or more consumers to request the media item;
determining, by the media sponsor via the one or more server computers, whether the media item has reached a first threshold of popularity, wherein the first threshold of popularity is based at least in part on a specified expected average amount of per-consumer requests for the media item;
sponsoring, by the media sponsor via the one or more server computers, the media item at a first sponsoring level at least in part in response to a determination that the media item has reached the first threshold of popularity, wherein said sponsoring comprises providing additional transmission of the media item;
determining, by the media sponsor via the one or more server computers, whether the media item has reached a second threshold of popularity; and
sponsoring, by the media sponsor via the one or more server computers, the media item at a second sponsoring level at least in part in response to the media item reaching the second threshold of popularity.

33. The method of claim 32, wherein said sponsoring the media item at the first sponsoring level comprises broadcasting the media item on a webcast station and wherein said sponsoring the media item at the second sponsoring level comprises transmitting the media item to a consumer for a fee.

34. The method of claim 32, wherein said sponsoring the media item at the first sponsoring level comprises transmitting the media item to a consumer for a fee, and wherein said sponsoring the media item at the second sponsoring level comprises broadcasting the media item on a webcast station.

35. The method of claim 32, wherein the media item comprises a song.

36. The method of claim 32, wherein the media item comprises a video.

37. The method of claim 32, wherein the media item comprises an image.

\* \* \* \* \*